United States Patent
Kim et al.

(12) United States Patent (10) Patent No.: US 9,428,942 B2
(45) Date of Patent: Aug. 30, 2016

(54) DOOR LOCKING DEVICE AND CONSTRUCTION MACHINE INCLUDING SAME

(71) Applicant: VOLVO CONSTRUCTION EQUIPMENT AB, Eskilstuna (SE)

(72) Inventors: Sung-Hwan Kim, Gimhae-si (KR); Han-Choul Shin, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/648,172

(22) PCT Filed: Dec. 12, 2012

(86) PCT No.: PCT/KR2012/010787
§ 371 (c)(1),
(2) Date: May 28, 2015

(87) PCT Pub. No.: WO2014/092214
PCT Pub. Date: Jun. 19, 2014

(65) Prior Publication Data
US 2015/0308162 A1 Oct. 29, 2015

(51) Int. Cl.
*B60J 7/00* (2006.01)
*E05B 79/22* (2014.01)
(Continued)

(52) U.S. Cl.
CPC .............. *E05B 79/22* (2013.01); *B62D 25/082* (2013.01); *B62D 33/00* (2013.01); *E02F 9/0891* (2013.01); *E05B 53/00* (2013.01); *E05B 85/16* (2013.01); *E05B 85/243* (2013.01); *E05B 83/22* (2013.01)

(58) Field of Classification Search
CPC .................. Y10T 292/1047; Y10T 292/1082; Y10T 292/57; Y10T 70/7068; Y10S 292/23; E05B 81/16; E05B 81/06; E05B 37/08

USPC ............ 296/190.11, 146.1, 187.12; 292/198, 292/201, 216, 336.3, DIG. 23; 70/303 A
See application file for complete search history.

(56) References Cited

U.S. PATENT DOCUMENTS 4,896,906 A * 1/1990 Weinerman ........... E05B 77/265
292/337

(Continued)

FOREIGN PATENT DOCUMENTS

| JP | 2004-044217 A | 2/2004 |
| JP | 2008-014027 A | 1/2008 |

(Continued)

OTHER PUBLICATIONS

International Search Report (in Korean and English) and Written Opinion (in Korean) for PCT/KR2012/010787, mailed Jun. 24, 2013; ISA/KR.

*Primary Examiner* — Kiran B Patel
(74) *Attorney, Agent, or Firm* — Harness, Dickey & Pierce, P.L.C.

(57) ABSTRACT

Disclosed are a door locking device which enables a user on the ground to easily open or close a side door even in the case where the height of the side door is changed, and a construction machine including the same. The door locking device, according to the present invention, comprises: a locking device case which is mounted on a side door; an operation handle which is rotationally fixed to the case; a striker which is mounted on a door frame for supporting the side door such that the side door can be opened or closed; a link which is rotationally fixed to the case and a lower end of which is connected to a rotation plate that is interlocked when the operation handle is operated; and a locking unit which is separated from the operation handle and connected to the upper end of the link so as to be mounted on the inside surface of the side door in the upward direction of the case, and which is interlocked by the link when the operation handle is operated so as to be locked to or released from the striker.

5 Claims, 5 Drawing Sheets

(51) Int. Cl.
  *E02F 9/08* (2006.01)
  *E05B 53/00* (2006.01)
  *B62D 25/08* (2006.01)
  *B62D 33/00* (2006.01)
  *E05B 85/16* (2014.01)
  *E05B 85/24* (2014.01)
  *E05B 83/22* (2014.01)

(56) References Cited

U.S. PATENT DOCUMENTS

| | | | | |
|---|---|---|---|---|
| 4,917,412 A * | 4/1990 | Swan | E05B 77/265 | 292/216 |
| 5,069,491 A * | 12/1991 | Weinerman | E05B 77/265 | 292/216 |
| 5,117,665 A * | 6/1992 | Swan | E05B 77/265 | 292/48 |
| 5,531,488 A * | 7/1996 | Yoshikuwa | E05B 63/0065 | 292/216 |
| 5,979,951 A * | 11/1999 | Shimura | E05B 85/26 | 292/216 |
| 6,406,073 B1 * | 6/2002 | Watanabe | E05B 77/265 | 292/216 |
| 6,554,329 B1 * | 4/2003 | DeBlock | E05B 83/36 | 292/216 |
| 6,913,298 B2 * | 7/2005 | Inoue | E05B 81/06 | 292/201 |
| 6,955,389 B2 * | 10/2005 | Suzuki | E05B 65/0811 | 292/201 |
| 6,964,438 B2 * | 11/2005 | Koike | E05B 81/20 | 292/201 |
| 7,293,806 B2 * | 11/2007 | Umino | E05B 77/54 | 292/201 |
| 7,309,100 B2 * | 12/2007 | Sawajiri | E05B 83/38 | 292/336.3 |
| 7,621,571 B2 * | 11/2009 | Umino | E05B 81/06 | 292/201 |
| 7,798,539 B2 * | 9/2010 | Hayakawa | E05B 81/06 | 292/201 |
| 7,827,836 B2 * | 11/2010 | Cetnar | E05B 77/26 | 292/201 |
| 7,874,599 B2 * | 1/2011 | Suzumura | E05B 79/08 | 292/201 |
| 7,878,034 B2 * | 2/2011 | Alber | E05C 7/06 | 292/142 |
| 7,926,857 B2 * | 4/2011 | Akizuki | E05B 77/26 | 292/201 |
| 8,011,700 B2 * | 9/2011 | Ishiguro | E05B 81/04 | 292/201 |
| 8,029,028 B2 * | 10/2011 | Akizuki | E05B 77/28 | 292/201 |
| 8,141,916 B2 * | 3/2012 | Tomaszewski | E05B 77/26 | 292/201 |
| 8,146,965 B2 * | 4/2012 | Akizuki | E05B 81/06 | 292/201 |
| 8,182,004 B2 * | 5/2012 | Yoda | E05B 81/06 | 292/201 |
| 8,235,428 B2 * | 8/2012 | Hunt | E05B 85/26 | 292/216 |
| 8,256,805 B2 * | 9/2012 | Ishiguro | E05B 77/26 | 292/201 |
| 8,267,444 B2 * | 9/2012 | Akizuki | E05B 77/26 | 292/201 |
| 8,276,949 B2 * | 10/2012 | Akizuki | E05B 77/06 | 292/201 |
| 8,562,033 B2 * | 10/2013 | Tomaszewski | E05B 85/01 | 292/201 |
| 8,726,705 B2 * | 5/2014 | Tabe | E05B 79/04 | 70/237 |
| 8,740,264 B2 * | 6/2014 | Akizuki | E05B 77/265 | 292/201 |
| 8,814,226 B2 * | 8/2014 | Akizuki | E05B 77/30 | 292/196 |
| 8,827,328 B2 * | 9/2014 | Akizuki | E05B 81/06 | 292/196 |
| 8,894,103 B2 * | 11/2014 | Shibayama | E05B 83/40 | 292/201 |
| 8,919,827 B2 * | 12/2014 | Akizuki | E05B 81/06 | 292/201 |
| 8,950,791 B2 * | 2/2015 | Yamagata | E05B 81/25 | 292/201 |
| 8,979,145 B2 * | 3/2015 | Yamagata | E05B 83/36 | 292/201 |
| 9,109,382 B2 * | 8/2015 | Yamaguchi | E05B 81/06 | |
| 9,140,037 B2 * | 9/2015 | Nagaoka | E05B 77/34 | |
| 9,249,605 B2 * | 2/2016 | Yamagata | E05B 79/08 | |

FOREIGN PATENT DOCUMENTS

KR  10-2010-0071363 A  6/2010
KR  10-2010-0125888 A  12/2010
KR  10-2012-0120732 A  11/2012

* cited by examiner

Fig. 1

Prior Art

Fig. 2a

Prior Art

Fig. 2b

Prior Art

Fig. 2c

Prior Art

DOOR LOCKING DEVICE AND CONSTRUCTION MACHINE INCLUDING SAME

TECHNICAL FIELD

The present invention relates to a door locking device and a construction machine including the same. More particularly, the present invention relates to such a door locking device which enables a user to easily open or close a side door mounted on an engine room or the like on the ground even if the height of the side door is changed, and a construction machine including the same.

BACKGROUND OF THE INVENTION

In general, a construction machine such as an excavator includes a side door openably/closably mounted on a side of an engine room mounted on an upper frame so that hydraulic parts inside the side door can be inspected or replaced.

Figure 1:
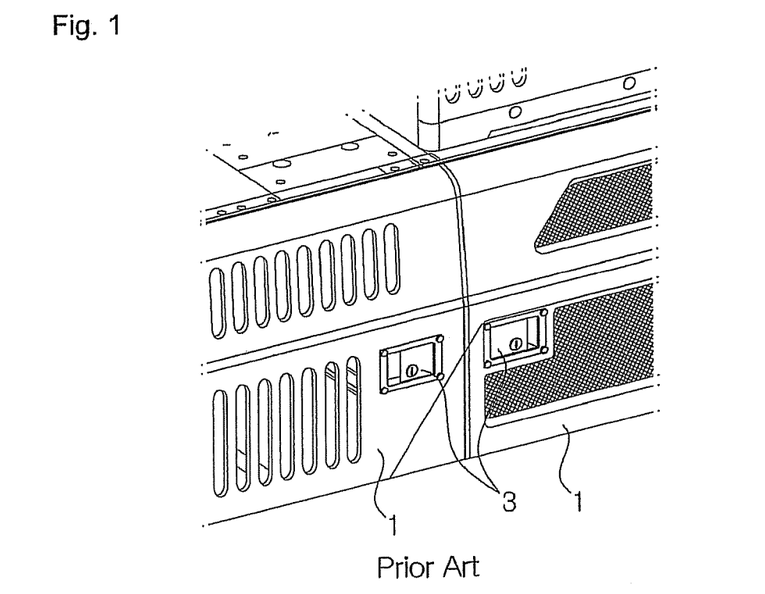
FIG. 1 is a diagrammatic view showing a state in which a door locking device of a construction machine in accordance with the prior art is mounted on a side door.
Figure 2A:
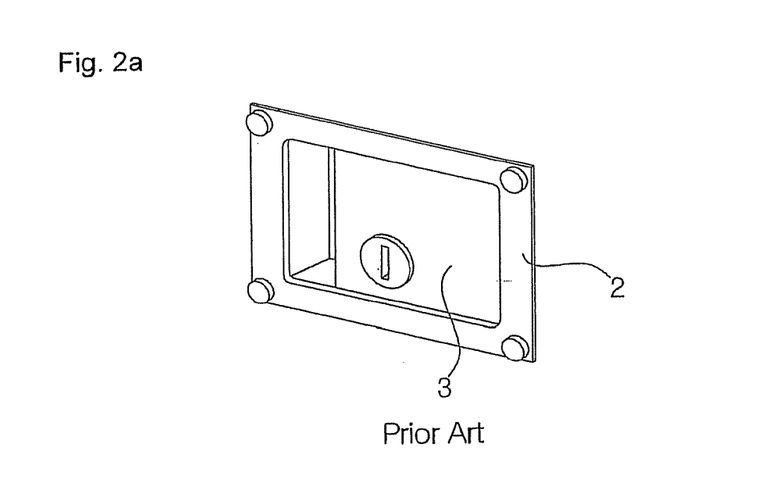
FIGS. 2(a), 2(b) and 2(c) are schematic views showing a door locking device of a construction machine in accordance with the prior art.
Figure 2B:
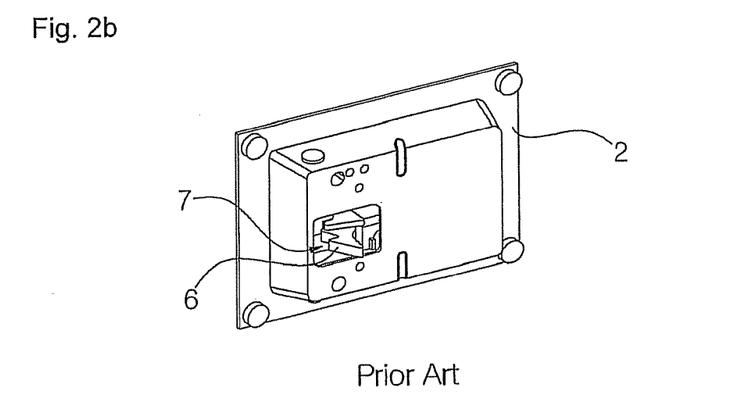
Figure 2C:
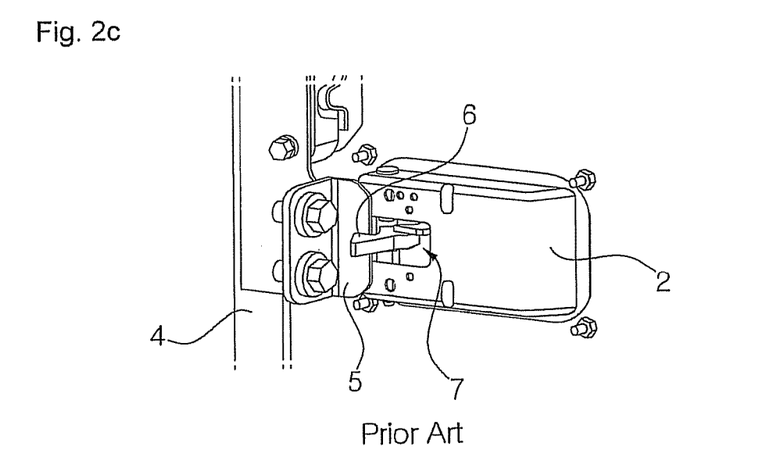

As shown in FIGS. 1, 2(*a*), 2(*b*) and 2(*c*), a door locking device of a construction machine includes:

a side door 1 openably/closably mounted on a side of an engine room;

a locking device case (hereinafter, referred to as "case") 2 mounted on the side door 1;

a manipulation handle 3 rotatably fixed to the case 2;

a striker 5 mounted on a door frame 4 that openably/closably supports the side door 1;

a locking unit 7 mounted within the case 2 and configured to swingably open/close the side door 1 relative to the door frame 4 by a locker 6 locked to or unlocked from the striker 5 upon manipulating the manipulation handle 3.

As shown in FIGS. 1, 2(*a*), 2(*b*) and 2(*c*), the manipulation handle 3 and the locking unit 7 are assembled integrally so as to be maintained and mounted on the same line of the case 2, and thus the mounting position of the manipulation handle 3 is restricted by the mounting position of the locking unit 7. In this case, the locking unit 7 is preferably mounted at an intermediate point of the entire height of the side door 1 in order to optimize the locking function of the locking device on the side door 1. As a result, the mounting position of the manipulation handle 3 is restricted by the locking unit 7 mounted at the optimized position of the side door 1.

In other words, if the height of the side door 1 is changed depending on the capacity of equipment, the mounting position of the manipulation handle 3 is determined by the mounting position of the locking unit 7, which is required depending on the height of the side door 1. For this reason, the position of a user is deviated from the optimal position of the manipulation handle 3 that can be manipulated to open or close the side door 1 on the ground.

Therefore, the conventional door locking device entails a problem in that the user suffers from an inconvenience in manipulating the locking device to open and unlock the side door 1 or close and lock the side door 1.

SUMMARY OF THE INVENTION

Accordingly, the present invention has been made to solve the aforementioned problems occurring in the prior art, and it is an object of the present invention to provide a door locking device which optimizes a locking function thereof and enables a user to easily manipulate a manipulation handle on the ground even if the height of the side door is changed, and a construction machine including the same.

TECHNICAL SOLUTION

To achieve the above object, in accordance with an embodiment of the present invention, there is provided a door locking device including:

a locking device case mounted on a side door;

a manipulation handle rotatably fixed to the case;

a striker mounted on a door frame that openably/closably supports the side door;

a link rotatably fixed to the case and connected at a lower end thereof to a rotary plate 18 that operates in cooperation with the manipulation handle upon manipulating the manipulation handle; and a locking unit connected to an upper end of the link so as to be separated from the manipulation handle and mounted on an inner surface of the side door so as to positioned above the case so that the locking unit is operated in cooperation with the manipulation handle by means of the link so as to be locked to or unlocked from the striker when the manipulation handle is manipulated.

In addition, in accordance with an embodiment of the present invention, there is provided a construction machine including a door locking device, including:

a lower traveling structure;

an upper frame swingably mounted on the lower traveling structure;

a cabin, an engine room, and a work apparatus, which are mounted on the upper frame;

a side door openably/closably mounted on a side of the engine room;

a locking device case mounted on the side door;

a manipulation handle rotatably fixed to the case;

a striker mounted on a door frame that openably/closably supports the side door;

a link rotatably fixed to the case and connected at a lower end thereof to a rotary plate that operates in cooperation with the manipulation handle upon manipulating the manipulation handle; and a latch member having first and second latch plates connected to an upper end of the link so as to be separated from the manipulation handle and mounted on an inner surface of the side door so as to positioned above the case so that the first and second latch plates are operated in cooperation with the manipulation handle by means of the link so as to be locked to or unlocked from the striker when the manipulation handle is manipulated.

The locking unit may include:

a latch member including a first latch plate rotatably connected to the upper end of the link and a second latch plate operated cooperatively with the rotation of the first latch plate when the manipulation handle is manipulated so that the latch member is locked to or unlocked from the striker to close or open the side door when the manipulation handle is manipulated;

a latch bracket securely fixed to an outer surface of the latch member by fastening members in such a manner that the first and second latch plates can be rotated about fixing pins, and having a groove formed thereon to allow the striker to be separated from or accommodated in the groove when the side door is opened or closed by the manipulation of the manipulation handle; and a pair of elastic members configured to press the first and second latch plates against the striker, respectively, in such a manner as to elastically support the first and second latch plates to transition the latch member from a locked state to an initial unlocked state.

The rotary plate may includes a first plate rotatably fixed to an outer surface of the case, and a second plate integrally formed to extend from the first plate so as to be rotated by a pressing piece of the manipulation handle, which projects to the outside of the case.

A retaining protrusion may be formed on one side of the first latch plate to limit the rotation angle of the second latch plate, and i a plurality of grooves s formed on the second latch plate to allow the retaining protrusion to be detachably retained in any one of the grooves when the latch member is locked to or unlocked from the striker.

The manipulation handle may include:

a pressing piece configured to press and rotate the rotary plate;

a grip part grasped to open or close the side door; and a body part rotatably fixed to a handle support member accommodated in the case by a fixing pin penetrating through the handle support member.

Advantageous Effect

The door locking device and the construction machine including the same in accordance with the present invention as constructed above has the following advantages.

Even if the height of the side door is changed, the locking function of the locking unit mounted at the optimal position can be exhibited optimally and a user can easily manipulate the manipulation handle on the ground, thereby providing convenience to the user.

BRIEF DESCRIPTION OF THE DRAWINGS

The above objects, other features and advantages of the present invention will become more apparent by describing the preferred embodiments thereof with reference to the accompanying drawings, in which.

*Explanation on reference numerals of main elements in the drawings*

10; engine room
12; locking device case
14; manipulation handle
16; striker
18; rotary plate
20; link
22; first latch plate
24; latch member
26; latch bracket
28; elastic member
30; handle support member
32; first plate
34; retaining protrusion

DETAILED DESCRIPTION OF THE INVENTION

Now, a door locking device in accordance with a preferred embodiment of the present invention and a construction machine including the same will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 3:
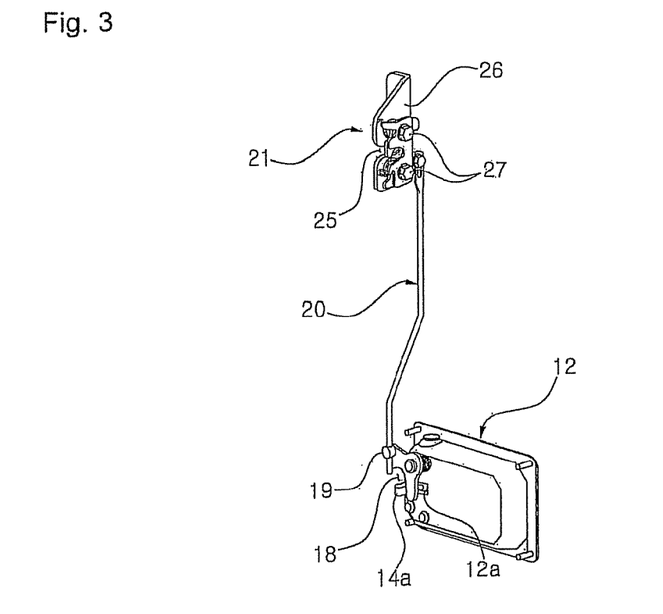
FIG. 3 is an assembled perspective view showing a door locking device in accordance with a preferred embodiment of the present invention.
Figure 4:
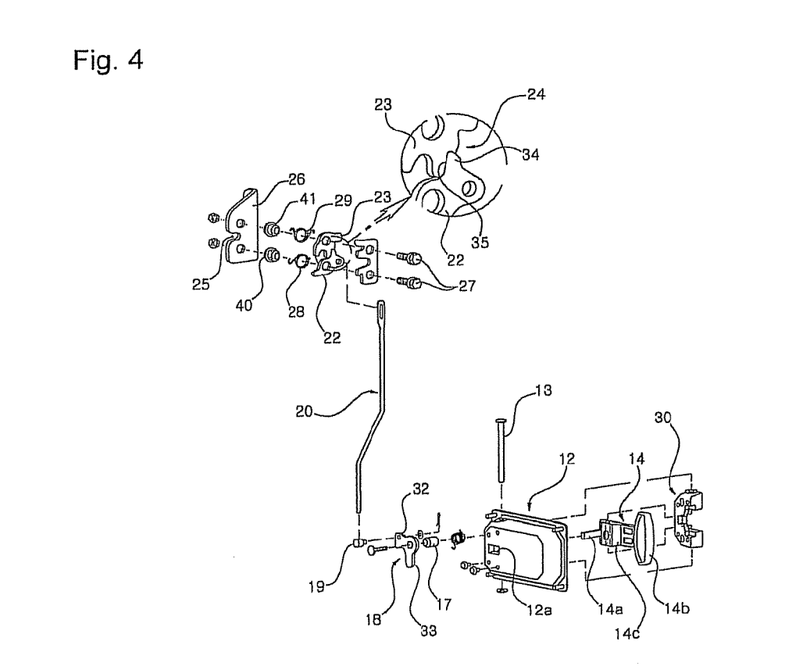
FIG. 4 is an exploded perspective view showing a door locking device in accordance with a preferred embodiment of the present invention.
Figure 5:
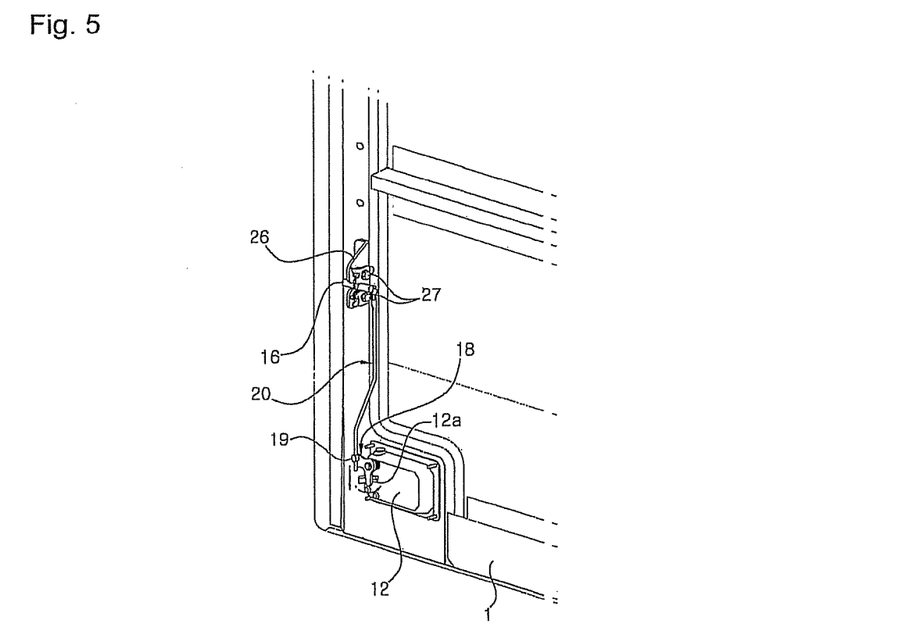
FIG. 5 is a diagrammatic view showing a state in which a door locking device in accordance with a preferred embodiment of the present invention is mounted on a side door.
Figure 6:
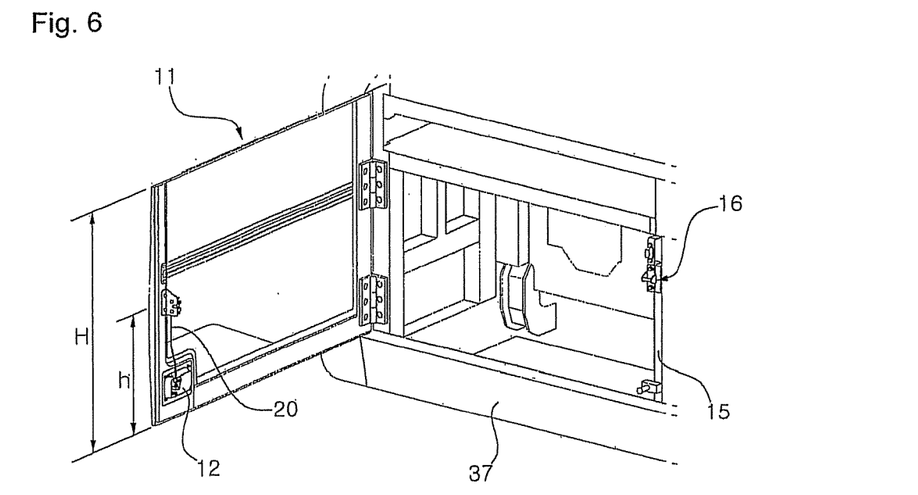
FIG. 6 is a diagrammatic view showing an opened state of a side door on which a door locking device in accordance with a preferred embodiment of the present invention is mounted.
Figure 7:
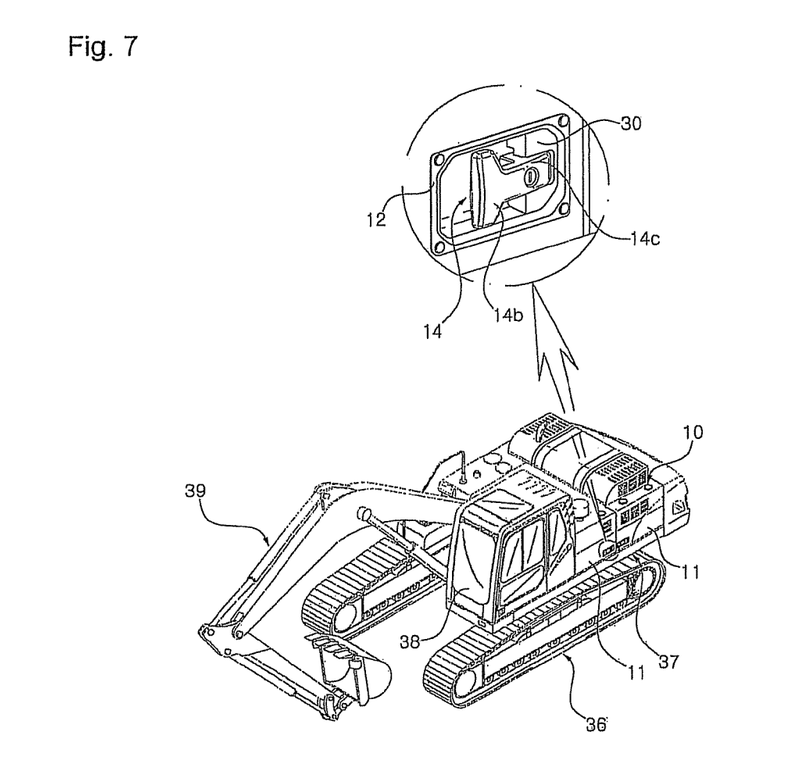
FIG. 7 is a perspective view showing a construction machine including a door locking device in accordance with a preferred embodiment of the present invention.

FIG. 3 is an assembled perspective view showing a door locking device in accordance with a preferred embodiment of the present invention, FIG. 4 is an exploded perspective view showing a door locking device in accordance with a preferred embodiment of the present invention, FIG. 5 is a diagrammatic view showing a state in which a door locking device in accordance with a preferred embodiment of the present invention is mounted on a side door, FIG. 6 is a diagrammatic view showing an opened state of a side door on which a door locking device in accordance with a preferred embodiment of the present invention is mounted, and FIG. 7 is a perspective view showing a construction machine including a door locking device in accordance with a preferred embodiment of the present invention.

Referring to FIGS. 3 to 7, the door locking device in accordance with an embodiment of the present invention includes:

a side door 11 mounted openably/closably in a swingable manner on a side of an engine room 10 of a construction machine such as an excavator;

a locking device case (hereinafter, also referred to as "case") 12 mounted on a side door 11 and opened at a front surface thereof, the case having a space defined therein;

a manipulation handle 14 accommodated in the inner space of the case 12 and rotatably fixed to the case 12 by means of a fixing pin 13;

a striker 16 mounted on a door frame 15 that openably/closably supports the side door 11;

a rotary plate 18 rotatably fixed to an outer surface of the case 12 by means of a fixing pin 17 and configured to be operated in cooperation with the manipulation handle 14 upon manipulating the manipulation handle 14;

a link 20 integrally connected at a lower end thereof to a fixing piece 19 fixed to one side of the rotary plate 18; and a locking unit 21 mounted on an inner surface of the side door 11 so as to positioned above the case 12 and connected to an upper end of the link 20 so as to be separated from the manipulation handle 14 to adjust the fixed position of the manipulation handle 14 on the side door 11 so that the locking unit 21 is operated in cooperation with the manipulation handle 14 by means of the link 20 so as to be locked to or unlocked from the striker 16 when the manipulation handle 14 is manipulated.

The locking unit includes:

a latch member 24 including a first latch plate 22 rotatably connected to the upper end of the link 20 and a second latch plate 23 operated cooperatively with the rotation of the first latch plate 22 when the manipulation handle 14 is manipulated so that the latch member 24 is locked to or unlocked from the striker 16 to close or open the side door 11 when the manipulation handle 14 is manipulated;

a latch bracket 26 securely fixed to an outer surface of the latch member 24 by fastening members (e.g., bolts) 27 in such a manner that the first and second latch plates 22 and 23 can be rotated about fixing pins 40 and 41, and having a groove 25 formed thereon to allow the striker 16 to be separated from or accommodated in the groove 25 when the side door 11 is opened or closed by the manipulation of the manipulation handle 14; and a pair of elastic members (e.g., torsion springs) 28 and 29 configured to press the first and second latch plates 22 and 23 against the striker 16, respectively, in such a manner as to elastically support the first and second latch plates 22 and 23 to transition the latch member 24 from a locked state to an initial unlocked state.

The rotary plate 18 comprises a first plate 32 rotatably fixed to an outer surface of the case 12, and a second plate 33 integrally formed to extend from the first plate 32 so as to be rotated by a pressing piece 14a of the manipulation handle 14, which projects to the outside of the case 12 through a through-opening 12a.

The manipulation handle 14 includes:

a pressing piece 14a configured to press and rotate the second plate 33 of the rotary plate 18;

a grip part 14b grasped to open or close the side door 11; and a body part 14c rotatably fixed to a handle support member 30 accommodated in the inner space of the case by a fixing pin 13 penetrating through the handle support member 30.

Referring to FIG. 3, a construction machine including a door locking device in accordance with another embodiment of the present invention includes:

a lower traveling structure 36;

an upper frame 37 swingably mounted on the lower traveling structure 36;

a cabin 38, an engine room 10, and a work apparatus 39, which are mounted on the upper frame;

a side door 11 mounted openably/closably in a swingable manner on a side of the engine room 10;

a locking device case (hereinafter, also referred to as "case") 12 mounted on the outer surface of a side door 11 and opened at a front surface thereof, the case having a space defined therein;

a manipulation handle 14 accommodated in the inner space of the case 12 and rotatably fixed to the case 12 by means of a fixing pin 13;

a striker 16 mounted on a door frame 15 that openably/closably supports the side door 11 in a swingable manner;

a rotary plate 18 rotatably fixed to an outer surface of the case 12 by means of a fixing pin 17 and configured to be operated in cooperation with the manipulation handle 14 upon manipulating the manipulation handle 14;

a link 20 integrally connected at a lower end thereof to a fixing piece 19 fixed to one side of the rotary plate 18; and a latch member 24 having first and second latch plates 22 and 23 connected to an upper end of the link 20 so as to be separated from the manipulation handle 14 to adjust a fixed position of the manipulation handle 14 to the side door 11 and mounted on an inner surface of the side door 11 so as to be positioned above the case 12 so that the first and second latch plates 22 and 23 are operated in cooperation with the manipulation handle 14 by means of the link 20 so as to be locked to or unlocked from the striker 16 when the manipulation handle 14 is manipulated.

In this case, the lower traveling structure 36, the upper frame 37, and the work apparatus 39 (including a boom, an arm, and a bucket) are constituent elements that are used in the art to which the present invention pertains, and thus a detailed description of a configuration thereof will be omitted to avoid redundancy.

In accordance with the above-described configuration, the opening operation of the side door 11 mounted openably/closably on the side of the engine room 10 will be described hereinafter.

When a user pulls the grip part 14b of the manipulation handle 14 accommodated in the inner space of the case 12 toward him or her, the manipulation handle 14 pivotally rotates about the fixing pin 13 to cause the pressing piece 14a of the manipulation handle 14 to press the second plate 33 of the rotary plate 18 mounted on the outer surface of the case 12. In other words, the rotary plate 18 rotates in a counterclockwise direction about the fixing pin 17 (i.e., rotates in an arrow direction indicated in FIG. 5) to cause the first plate 32 of the rotary plate 18 to descend toward the pressing piece 14a.

The rotation of the rotary plate 18 causes the link 20 integrally fixed to one side of the first plate 32 to be downwardly moved (i.e., descend in the arrow direction indicated in FIG. 5). As a result, the first latch plate 22 connected to the upper end of the link 20 rotates in a clockwise direction about the fixing pin 40 by means of the link 20. The first latch plate 22 is mounted elastically to allow a rotational force to act in a counterclockwise direction by the elastic member 28. Simultaneously, the second latch plate 23 rotates in a clockwise direction about the fixing pin 41 by an elastic restoring force of the elastic member 29. The second latch plate 23 is mounted elastically to allow a rotational force to act in a clockwise direction by the elastic member 28.

Thus, the second latch plate 23 whose rotational force is suppressed by the retaining protrusion 34 formed on the first latch plate 22 rotates in a clockwise direction by the elastic restoring force of the elastic member 29 to cause the latch member 24 to be unlocked from the striker 16 so that the locking unit 21 can be separated from the striker 16. Resultantly, the side door 11 whose locking function is released can be opened swingably relative to the door frame 15.

Meanwhile, the closing operation of the side door 11 mounted openably/closably on the side of the engine room 10 will be described hereinafter.

When the user pivotally rotates the side door 11 to close the side of the engine room 10, the groove 25 formed on the latch bracket 26 of the locking unit 21 is fitted around the striker 16 mounted on the door frame 15. In other words, when the striker 16 of the door frame 15 is fitted into the groove 25 of the latch bracket 26, the retaining protrusion 34 of the first latch plate 22 limits the rotation angle of the second latch plate 23. Thus, the striker 16 is restricted from escaping from the groove 25 of the latch bracket 26 by first and second latch plates 22 and 23 so that the side door 11 can be maintained in a locked state by the locking unit 21.

As described above, when the manipulation handle 14 is manipulated to open the side door 11, the link 20 is operated in cooperation with the manipulation handle 14 so that the locking unit 21 connected to the upper end of the link 20 is unlocked from the striker 16. In other words, the first and second latch plates 22 and 23 are unlocked from the striker 16 formed on the door frame 15 to cause the locking unit 21 to be separated from the striker 16 so that the side door 11 can be opened relative to the side of the engine room 10.

In this case, when the locking unit 21 is mounted at an intermediate point h of the entire height H of the side door 11, the locking function of the locking unit 21 is exhibited optimally.

That is, the manipulation handle 14 and the locking unit 21 are disposed so as to be separated from each other in such a manner that the locking unit 21 is operated in cooperation with the manipulation handle 14 by the link 20, so that even if the height of the side door 11 is changed depending on the capacity of equipment, the mounting position of the manipulation handle 14 can be adjusted.

As one example, even if the height of the side door 11 from the ground surface is increased and the locking unit 21 is positioned at an intermediate point of the increased height of the side door 11 in the large-scale equipment, the manipulation handle 14 can be mounted on the side door 11 so as to be positioned at a height that can be easily adjusted by a user on the ground.

In this case, the locking unit 21 is positioned at the optimal height required depending on the height of the side door 11 so that the locking function of the door locking device is improved. Besides, the manipulation handle 14 is mounted on the side door 11 irrespective of the position of the locking unit 21 so that the user can easily manipulate the manipulation handle 14 to open or close the side door 11 on the ground.

INDUSTRIAL APPLICABILITY

In accordance with the door locking device and the construction machine including the same of the present invention as constructed above, even if the height of the side door is changed, the locking function of the locking device can be exhibited optimally and the user can easily manipulate the manipulation handle on the ground.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A door locking device comprising:
    a locking device case mounted on a side door;
    a manipulation handle rotatably fixed to the case;
    a striker mounted on a door frame that openably/closably supports the side door;
    a link rotatably fixed to the case and connected at a lower end thereof to a rotary plate that operates in cooperation with the manipulation handle upon manipulating the manipulation handle; and
    a locking unit connected to an upper end of the link so as to be separated from the manipulation handle and mounted on an inner surface of the side door so as to positioned above the case so that the locking unit is operated in cooperation with the manipulation handle by the link so as to be locked to or unlocked from the striker when the manipulation handle is manipulated.

2. The door locking device according to claim 1, wherein the locking unit comprises:
    a latch member including a first latch plate rotatably connected to the upper end of the link and a second latch plate operated cooperatively with the rotation of the first latch plate when the manipulation handle is manipulated so that the latch member is locked to or unlocked from the striker to close or open the side door when the manipulation handle is manipulated;
    a latch bracket securely fixed to an outer surface of the latch member by a fastening member in such a manner that the first and second latch plates can be rotated about fixing pins, and having a groove formed thereon to allow the striker to be separated from or accommodated in the groove when the side door is opened or closed by the manipulation of the manipulation handle; and
    a pair of elastic members configured to press the first and second latch plates against the striker, respectively, in such a manner as to elastically support the first and second latch plates to transition the latch member from a locked state to an initial unlocked state.

3. The door locking device according to claim 1, wherein the rotary plate comprises a first plate rotatably fixed to an outer surface of the case, and a second plate integrally formed to extend from the first plate so as to be rotated by a pressing piece of the manipulation handle, which projects to the outside of the case.

4. The door locking device according to claim 2, wherein a retaining protrusion is formed on one side of the first latch plate to limit the rotation angle of the second latch plate, and a plurality of grooves is formed on the second latch plate to allow the retaining protrusion to be detachably retained in any one of the grooves when the latch member is locked to or unlocked from the striker.

5. The door locking device according to claim 1, wherein the manipulation handle comprises:
    a pressing piece configured to press and rotate the rotary plate;
    a grip part grasped to open or close the side door; and
    a body part rotatably fixed to a handle support member accommodated in the case by a fixing pin penetrating through the handle support member.

\* \* \* \* \*